United States Patent
Taylor et al.

(10) Patent No.: US 9,693,533 B2
(45) Date of Patent: Jul. 4, 2017

(54) SCOOPING PAN

(71) Applicant: PROCESS4, INC., Chagrin Falls, OH (US)

(72) Inventors: Curtis Taylor, Chagrin Falls, OH (US); Matthew Hanson, Chagrin Falls, OH (US); David Hudak, Solon, OH (US)

(73) Assignee: Process4, Inc., Chagrin Falls, OH (US)

( * ) Notice: Subject to any disclaimer, the term of this patent is extended or adjusted under 35 U.S.C. 154(b) by 0 days.

(21) Appl. No.: 15/012,121

(22) Filed: Feb. 1, 2016

(65) Prior Publication Data

US 2016/0227728 A1 Aug. 11, 2016

Related U.S. Application Data

(60) Provisional application No. 62/112,944, filed on Feb. 6, 2015.

(51) Int. Cl.

| | | |
|---|---|---|
| *A01K 1/01* | (2006.01) | |
| *B07B 1/02* | (2006.01) | |
| *A01K 23/00* | (2006.01) | |
| *E01H 1/12* | (2006.01) | |
| *B65D 51/18* | (2006.01) | |

(52) U.S. Cl.
CPC .......... *A01K 1/0114* (2013.01); *A01K 23/005* (2013.01); *B07B 1/02* (2013.01); *B65D 51/18* (2013.01); *E01H 1/1206* (2013.01); *B65D 2547/06* (2013.01)

(58) Field of Classification Search
CPC .... A01K 1/0114; A01K 23/005; B65D 51/18; B65D 2547/06; E01H 1/1206; B07B 1/02

USPC ................ 15/257.1, 257.3, 257.6; 294/53.5, 294/176–180

See application file for complete search history.

(56) References Cited

U.S. PATENT DOCUMENTS

| | | | | |
|---|---|---|---|---|
| 2,812,784 | A * | 11/1957 | Palmer ................... | A47L 13/52 118/504 |
| 3,026,138 | A * | 3/1962 | Benjamin .............. | A01K 39/01 294/178 |
| 3,986,744 | A * | 10/1976 | Krogstad et al. ..... | E04H 1/1206 294/155 |
| 4,368,907 | A * | 1/1983 | Ross ...................... | E01H 1/1206 294/1.4 |
| 5,575,520 | A * | 11/1996 | Northcutt .............. | E01H 1/1206 141/108 |
| 5,715,564 | A * | 2/1998 | Knouse .................. | A47L 13/52 15/257.1 |
| 6,038,795 | A * | 3/2000 | Navarro ................. | E02F 3/60 172/26.5 |
| 6,612,379 | B1 * | 9/2003 | Timmons ................ | A01B 1/02 172/375 |
| 6,643,892 | B1 * | 11/2003 | Murphy .................. | A47L 13/52 15/257.3 |

(Continued)

*Primary Examiner* — Jeanette E Chapman
(74) *Attorney, Agent, or Firm* — Fay Sharpe LLP

(57) ABSTRACT

A scooping pan having a rear dumping feature that can be configured to scoop up general refuse, pet refuse, urine clumps, etc. from the ground, a litter box, etc. The scooping pan can optionally include one or more openings or slots that enable litter to pass through the openings or slots when the pet refuse, urine clumps, etc. are removed from the litter box. The rear of the scooping pan includes an openable flap that enables the general refuse, pet refuse, urine clumps, etc. in the scooping pan to be dumped out of the rear of the scooping pan.

24 Claims, 6 Drawing Sheets

(56) References Cited

U.S. PATENT DOCUMENTS

| | | | | |
|---|---|---|---|---|
| 7,810,860 | B2* | 10/2010 | Bell | E01H 1/1206 |
| | | | | 294/1.3 |
| 8,919,708 | B1* | 12/2014 | Graves | B65F 1/1415 |
| | | | | 141/390 |
| 8,985,653 | B1* | 3/2015 | Kest | A01K 1/0114 |
| | | | | 294/1.3 |
| 9,133,592 | B2* | 9/2015 | Becattini, Jr. | E01H 1/1206 |
| 9,386,901 | B1* | 7/2016 | Baker | A47L 13/52 |
| 2004/0189026 | A1* | 9/2004 | Denham | E01H 1/1206 |
| | | | | 294/1.3 |
| 2007/0170732 | A1* | 7/2007 | Platt | A01K 1/0114 |
| | | | | 294/1.3 |

\* cited by examiner

SCOOPING PAN

CROSS-REFERENCE TO RELATED APPLICATIONS

This application claims priority to U.S. Provisional Patent Application Ser. No. 62/112,944, filed Feb. 6, 2015, which is fully incorporated by reference.

The present invention is directed to a scooping pan having an openable and closable rear dumping feature that enables materials collected by the scooping pan to be removed from the scooping pan via such rear dumping feature. The present invention is also directed to a scooping pan having a plurality of apertures and an openable and closable rear dumping feature that enables materials collected by the scooping pan to be removed from the scooping pan via such rear dumping feature.

BACKGROUND ON THE INVENTION

Many different types of sifting devices, including mesh screens, have been used in the past for the purpose of sifting through and separating one material from another. Generally, these mesh screens contain openings for allowing one material (with smaller particle size) to pass through the screen while the other material (with larger particle size) is to be retained by the screen.

One type of material that regularly needs sifting is pet litter. Pet litter comes in many different formulations configured to absorb excrement, including urine and fecal matter, in a manner that reduces odor, minimizes animal contact, and facilitates disposal. Pet litter is made of a mixture of varying sized particles that typically have a maximum width or diameter of about two or three millimeters. Commercially available litters include clumping litters made of granulated bentonite, such as calcium bentonite, quartz-bentonite mixture, or silica-based litters made of a silica gel or silica crystal.

Pet waste scoops, also referred to as litter scoops, have long been used to sift pet litter to separate pet waste containing fecal matter and litter that has absorbed excrement from unspent litter. Many configurations of litter scoops are available and all require that the litter be scooped in a retaining pan portion of the litter scoop and then the litter scoop is turned sideways or pivoted forwardly to dump the contents from the pan portion. As the pan portion fills with contents, it must be constantly emptied since the contents will generally move off the pan portion when attempting to scoop other material from the litter box.

In view of the prior art, there remains a need for a scooping pan that can easily and conveniently be used to separate contaminated from uncontaminated material, and which pan can be used to easily and conveniently separate waste material (e.g., pet refuse, urine clumps, etc.) from uncontaminated litter in a litter box.

SUMMARY OF THE INVENTION

The present invention is directed to a scooping pan having an openable and closable rear dumping feature that enables materials collected in the scoop or pan portion of the scooping pan to be removed either from the scooping pan via such rear dumping feature or directly from the scoop portion. The scoop portion may or may not include one or more apertures in the base of the scoop portion. When the scoop portion does not include one or more apertures in the base of the scoop portion, the scooping pan can be used as a dust pan to collect debris from a floor or other surface. When the scoop portion includes one or more apertures in the base of the scoop portion, the scooping pan can be used as a litter scoop to enable unused or unclumped litter to be separated from the used or clumped litter via the one or more apertures in the scoop portion. The scooping pan of the present invention can be configured for use with removal of waste material (e.g., general refuse [e.g., dust, dirt, leaves, dropped or spilled food, broken glass, fur balls, etc.], pet refuse, urine clumps, etc.) from a litter box, the ground, etc. and will be described with particular reference thereto; however, it can be appreciated that the scooping pan of the present invention can be used in the collection and/or sifting of other particulate objects (e.g., sand, dirt, debris, etc.).

In accordance with one non-limiting embodiment of the present invention, there is provided a scooping pan suitable for use with the collection, sifting, and disposing of pet refuse, urine clumps, etc. from a litter box. The scooping pan can be designed to operably open and close; however, this is not required. The scooping pan can be configured to provide a means of collecting, sifting and disposing of material from pet litter.

In accordance with another and/or alternative non-limiting embodiment of the present invention, there is provided a scooping pan which can include a scoop portion, a handle portion, and a rear dumping feature. The material of the scoop portion, handle portion, and rear dumping feature can be the same; however, this is not required. As can be appreciated, the material of at least one of the scoop portion, handle portion, and rear dumping feature can be different from one or more other components of the scooping pan. In one non-limiting embodiment, the material of the one or more components of the scooping pan can be a high-density polyethylene (HDPE) plastic, a low-density polyethylene (LDPE) plastic, a rubber material, polyvinyl chloride (PVC), various types of resins, various types of resin epoxides, polyester, polypropylene, polyurethane, polyacrylate, and copolymers thereof, etc. As can be appreciated, the scooping pan of the present invention can be formed from other or additional materials (e.g., metal, wood, composite materials, ceramic, etc.). The scoop portion and the handle portion can be integrally formed; however, this is not required.

In accordance with another and/or alternative non-limiting embodiment of the present invention, the scooping pan can be used to efficiently capture contaminated and uncontaminated cat litter material; however, this is not required.

In accordance with another and/or alternative non-limiting embodiment of the present invention, the scooping pan can allow a user to sift through pet litter and effectively and efficiently separate the contaminated litter from the uncontaminated litter; however, this is not required.

In accordance with another and/or alternative non-limiting embodiment of the present invention, the scooping pan includes a scoop portion which can provide a means of collecting and/or sifting waste material. The scoop portion can comprise a base and optionally one or more side walls which extend upwardly from the base; however, this is not required. In one non-limiting embodiment, the scoop portion includes two side walls that are connected to the side edge of the base and extend upwardly from the top surface of the base; however, this is not required. The side walls, when used, can have a constant height along the fully length of the side wall or the height can vary along the length of the side wall. In one non-limiting arrangement, the height of the side walls varies along the length of the side walls. In one non-limiting configuration, the height of the side wall is lower at the front portion of the base than the height of the side wall at the rear of the base; however, this is not required. The base can have a constant or varied width along the length of the base. In one non-limiting configuration, the width of the base is greater at the front portion of the base and the width of the base at the rear portion of the base; however, this is not required. The top surface of the base can lie in the same plane or one or more portions of the top surface of the base can lie in different planes. In one non-limiting arrangement, the top surface of the front portion of the base lies in generally the same plane, and the top surface in the rear portion of the base curves upwardly from the top surface of the front portion and thereby lies in a different plane from the plane of the top surface of the front portion of the base; however, this is not required. The surface area of the top surface of the front portion of the base can be the same, less than or greater than the surface area of the top surface of the rear portion of the base. In one non-limiting arrangement, the ratio of the surface area of the top surface of the front portion of the base to the surface area of the top surface of the rear portion of the base is about 1-50:1 (and all values and ranges there between), typically 1.2-10:1, more typically 1.25-5:1, and still more typically 1.5-3:1.

In accordance with another and/or alternative non-limiting embodiment of the present invention, the front end of the base can optionally include a lip. In one non-limiting arrangement, the top surface of the lip slopes downwardly from the top surface of the base that joins with the top surface of the lip; however, this is not required. Side walls can extend upwardly from the top surface of the lip; however, this is not required.

In accordance with another and/or alternative non-limiting embodiment of the present invention, the base can include one or more structural ribs to add strength and rigidity to the base; however, this is not required. In one non-limiting arrangement, the base includes one or more structural ribs having a longitudinal axis that extends at least a portion of the longitudinal length of the base; however, this is not required. The longitudinal length and/or width of the structural ribs can be the same or different. In one non-limiting configuration, the base includes a plurality of structural ribs and the structural ribs have a width that is greater at the rear portion of the base than the width of the structural ribs at the front portion of the base; however, this is not required. In another non-limiting configuration, the base includes a plurality of structural ribs and the structural ribs have a width that constant along the longitudinal length of the structural ribs; however, this is not required. In another non-limiting configuration, the base includes a plurality of structural ribs and two or more of the structural ribs have a longitudinal length that is different; however, this is not required. In another non-limiting configuration, the base includes a plurality of structural ribs and the structural ribs have a longitudinal length that is the same; however, this is not required.

In accordance with another and/or alternative non-limiting embodiment of the present invention, the scooping pan can include a top portion that extends from the side walls and overlies at least a portion of the top surface of the base; however, this is not required. Generally, the bottom surface of the top portion is spaced from the top surface of the base a distance that will not typically interfere with the collection of material in the base. In one non-limiting arrangement, the bottom surface of the top portion is spaced from the top surface of the base a distance of at least about 1 inch, and typically about 1-5 inches (and all values and ranges therebetween), more typically about 1.5-4 inches and still more typically 2-3.5 inches. In another non-limiting arrangement, the top portion only overlies a portion of the top surface of the base; however, this is not required. Generally, the top portion only overlies less than 50% of the top surface of the base; however, this is not required. In one non-limiting configuration, the top portion only overlies about 5-90% of the top surface of the base (and all values and ranges therebetween), typically the top portion only overlies about 5-50% of the top surface of the base, more typically the top portion only overlies about 5-45% of the top surface of the base, and even more typically the top portion only overlies about 5-30% of the top surface of the base.

In accordance with another and/or alternative non-limiting embodiment of the present invention, the scooping pan includes a rear dumping feature in the form of a rear retaining pocket that is connected to the read end of the scoop portion (e.g., base of the scoop portion, etc.). The rear retaining pocket is configured to hold material that has been scooped up by the base of the scooping pan; however, this is not required. The rear retaining pocket is formed of a retaining side wall which partially or fully encircles the retaining cavity. The retaining cavity has a front opening that allows materials in the base to be moved from the top surface of the base and into the cavity. The rear retaining pocket includes a rear retaining wall that partially or fully closes the rear of the retaining cavity so that materials can be held in the retaining cavity. In one non-limiting arrangement, the back portion of the base can be narrower than the front portion of the base for the purpose of funneling material on the top surface of the base into the rear retaining pocket; however, this is not required. The cross-sectional shape of the rear retaining pocket can be constant or vary along the longitudinal length of the rear retaining pocket. The cross-sectional shape of the rear retaining pocket is non-limiting. In one non-limiting configuration, the cross-sectional shape of the rear retaining pocket is generally circular, oval, square, rectangular or D-shaped. The base of the rear retaining pocket can be level with the top surface of the front portion of the base or be elevated above the top surface of the front portion of the base.

In accordance with another and/or alternative non-limiting embodiment of the present invention, the rear retaining wall on the rear retaining pocket is moveable between and open and closed position; however, this is not required. Such a feature enables material in the retaining cavity to be removed via the rear opening in the retaining cavity when the rear retaining wall is moved to an opening position. In one non-limiting arrangement, the rear retaining wall is connected to the retaining side wall so that the rear retaining wall can pivot relative to the retaining side wall between the open and closed positions. In one non-limiting configuration, a flexible hinge or living hinge can be used or a standard hinge or pivot rod can be used to pivotally connect the moveable rear retaining wall to the retaining side wall. The moveable rear retaining wall can be designed to be opened manually or by a motor mechanism. In one non-limiting arrangement, a manual push button, turnable knob, sliding switch, etc. can be used to cause the moveable rear retaining wall to move to the open and/or closed position. The moveable rear retaining wall can include a locking arrangement to lock the rear retaining wall in the closed position; however, this is not required. One non-limiting locking arrangement can be a latch arrangement. The moveable rear retaining wall can form a liquid seal with the edge of the retaining side wall; however, this is not required. The moveable rear retaining wall can be biased in the closed position; however, this is not required. The biasing arrangement can be in the form of a spring; however, this is not required.

In accordance with another and/or alternative non-limiting embodiment of the present invention, the scooping pan can optionally include a handle portion. The handle portion is configured to be grasped so that the user can maneuver the scoop portion so as to cause materials to move into scoop portion or to move the scoop portion in position to receive materials. The handle portion can be connected to any region of the scooping pan. In one non-limiting arrangement, the handle portion is connected to the rear of the base, the rear retaining pocket, and/or the top portion. In one non-limiting particular configuration, the handle portion is partially or fully connected to the top portion. In another non-limiting arrangement, the handle portion extends from the rear portion of the base to the front portion of the base. In such as arrangement, the handle portion extends over the top surface of the base. In one non-limiting configuration, the handle portion is positioned about 1-5 inches (and any value or range therebetween) above the top surface of the base; however, other distances can be used. In another non-limiting configuration, a majority of the longitudinal length (e.g., 50.1-100% and all values or ranges therebetween) is positioned over the top surface of the base; however, this is not required. In another non-limiting configuration, the end of the handle portion does not extend past the front end of the base; however, this is not required. In another non-limiting configuration, the longitudinal central axis of the handle portion lies in a plane that is generally parallel to the plane of the top surface of the front portion of the base; however, this is not required. In another non-limiting configuration, the longitudinal central axis of the handle portion lies in a plane that is generally non-parallel to the plane of the top surface of the front portion of the base; however, this is not required. In one non-limiting configuration, the longitudinal central axis of the handle portion lies in a plane that angles upwardly from the plane of the top surface of the front portion of the base. The dimensions of the handle portion are non-limiting. In another non-limiting configuration, the length of the handle portion is about 2-8 inches (and all values or ranges therebetween); however, this is not required. The cross-sectional shape of the handle portion can have any shape (e.g., circular, oval, square, etc.) and all values or ranges therebetween); however, this is not required. However, it can be appreciated that other diameter and/or dimensions can be used.

In accordance with another and/or alternative non-limiting embodiment of the present invention, the handle portion can optionally include a lever, button, or other type of actuator that is configured to cause the moveable rear retaining wall to move to the open and/or closed position. In one non-limiting arrangement, the handle portion can be comprised of one or more components (a housing and a rod); however, this is not required. The housing can optionally have a substantially cylindrical shape with a hollow core. The rod can be configured to move within the housing of the handle portion. The rod can be cylindrical in shape; however, this is not required. The rod can include a first end capable of being pushed by the user and a second end capable of driving the moveable rear retaining wall to the open position; however, this is not required. The driving end can be beveled; however, this is not required. The rod can be inserted at least partially in the housing such that the driving end of the rod faces the moveable rear retaining wall and the button end faces away from the moveable rear retaining wall. The diameter of the rod is generally less than the diameter of the housing. The rod can be attached to the housing such that when the rod is pushed inwardly into the housing, the driving end of the rod leaves the housing and exerts a force on the moveable rear retaining wall thereby moving the moveable rear retaining wall to the open position. As such, the handle portion can be used to control the moveable rear retaining wall between the open and closed positions so as to control the release of materials from the retaining cavity of the rear retaining pocket.

In accordance with another and/or alternative non-limiting embodiment of the present invention, the handle portion can optionally be textured with a plurality of slip-resistant surface projections for the purpose of improving grip when wet. The textured pattern on the outer surface of the handle portion is non-limiting.

In accordance with another and/or alternative non-limiting embodiment of the present invention, a portion or all of the scooping pan can be formed of a clear or semi-clear material to enable a user to visually see if material is retained in the scooping pan and/or the rear retaining pocket, and/or to see is material is properly flowing out of the rear retaining pocket when the moveable rear retaining wall is in the open position; however, this is not required.

In accordance with another and/or alternative non-limiting embodiment of the present invention, one or more openings or slots can be optionally provided in the base, the side walls and/or the rear retaining pocket of the scooping pan. The one or more openings or slots can be used to allow unclumped pet litter to be separated from the clumped pet letter in the base and/or rear retaining pocket and allow such unclumped pet litter to return to the litter box; however, this is not required. This unique structure of the scooping pan allows for the reduction of the waste of unused litter by sifting out contaminated/used litter and separating it from the uncontaminated/unused litter. The shape of the openings or slots can be circular, elliptical, square, rectangular, trapezoidal, etc. As can be appreciated, other opening or slot shapes can be used. The size of the slots is selected so as to retrain most of the clumped pet litter on the scooping pan. Generally, the slots are configured so as to prevent clumps having a diameter greater than about 1 inch from passing through the slots, or clumps having a width of greater than 1 inch from passing through the slots. As such, when the slots have a generally circular shape, the diameter of the slots is less than 1 inch, typically less than 0.75 in, more typically less than 0.5 inch, and even more typically less than 0.25 inch. When the slot is generally square, the sides of the square slots are less than 1 inch, typically less than 0.75 in, more typically less than 0.5 inch, and even more typically less than 0.25 inch. When the slot is generally rectangular, the shorter side or width of the rectangular slot is less than 1 inch, typically less than 0.75 in, more typically less than 0.5 inch, and even more typically less than 0.25 inch. As can be appreciated, the one or more of the slots can have other shapes (e.g., oval, polygonal, semi-circular, etc.). The slots can have the same shape and size; however, this is not required. Generally, the base of the scooping pan includes a plurality of slots. The rear retaining pocket can optionally include one or more slots.

In accordance with another and/or alternative non-limiting embodiment of the present invention, the scooping pan can optionally be configured such that the base, the side walls, and/or the rear retaining pocket of the scooping pan do not include one or more openings or slots.

In accordance with another and/or alternative non-limiting embodiment of the present invention, the scooping pan can optionally include a foot flange in the rear of the scooping pan to enable a user to step on the foot flange and maintain the position of the scooping pan when sweeping contents into the base of the scooping pan; however, this is not required.

A general method using the scooping pan of the present invention in conjunction with picking-up waste material (and wherein the base is absent one or more slots or openings) can be performed by the following steps: locating an area where waste material is to be picked up; inserting the front edge of the base of the scooping pan in front of the waste material; moving the waste material onto the top surface of the base (e.g., sweeping the waste material onto the base via a broom or brush, etc.); rotating the scooping pan such that it's held in a partially or fully vertical orientation to cause the waste material on the top surface of the base of the scooping pan to move to the rear retaining pocket of the scooping pan; positioning the scooping pan over a garbage receptacle, bag, etc.; causing the moveable rear retaining wall to move to the open position to allow the contents of the rear retaining pocket to flow from the rear retaining pocket and into the garbage receptacle, bag, etc. When the handle portion includes an actuator for the moveable rear retaining wall, the user can depress a button on the front end of the handle portion and/or some other actuation member located on the handle portion to cause the moveable rear retaining wall to move to the open position. Once the scooping pan is emptied, the moveable rear retaining wall is caused to move to the closed position and the above steps for picking-up waste material are repeated as required. The scoop portion can include a lip (e.g., angled lip) to facilitate in the sweeping or otherwise moving of the waste material onto the top surface of the base; however, this is not required.

A general method using the scooping pan of the present invention in conjunction with a cat litter box can be performed by the following steps: obtaining a cat litter box; inserting the front edge of the base of the scooping pan into the cat litter so as to collect a portion of the cat litter; lightly sifting the material collected such that the uncontaminated cat litter falls through the one or more slots or openings in the base of the scooping pan while retaining the clumped or contaminated litter on the top surface of the base of the scooping pan; rotating the scooping pan such that it's held in a partially or fully vertical orientation to cause the clumped or contaminated litter on the top surface of the base of the scooping pan to move to the rear retaining pocket of the scooping pan; positioning the scooping pan over a garbage receptacle, bag, etc.; causing the moveable rear retaining wall to move to the open position to allow the contents of the rear retaining pocket to flow from the rear retaining pocket and into the garbage receptacle, bag, etc. When the handle portion include an actuator for the moveable rear retaining wall, the user can depress a button on the front end of the handle portion and/or some other actuation member located on the handle portion to cause the moveable rear retaining wall to move to the open position. Once the scooping pan is emptied, the moveable rear retaining wall is caused to move to the closed position and the above steps for cleaning the litter box are repeated as required.

In accordance with another and/or alternative non-limiting embodiment of the present invention, the scooping pan can be quickly and easily disassembled for cleaning; however, this is not required.

These and other objects, features, and advantages of the present invention will become apparent from the subsequent description taken in conjunction with the accompanying drawings.

BRIEF DESCRIPTION OF THE DRAWINGS

Reference may now be made to the drawings, which illustrate various non-limiting embodiments that the invention may take in physical form and in certain parts and arrangements of parts wherein.

DETAILED DESCRIPTION OF NON-LIMITING EMBODIMENTS

Figure 1:
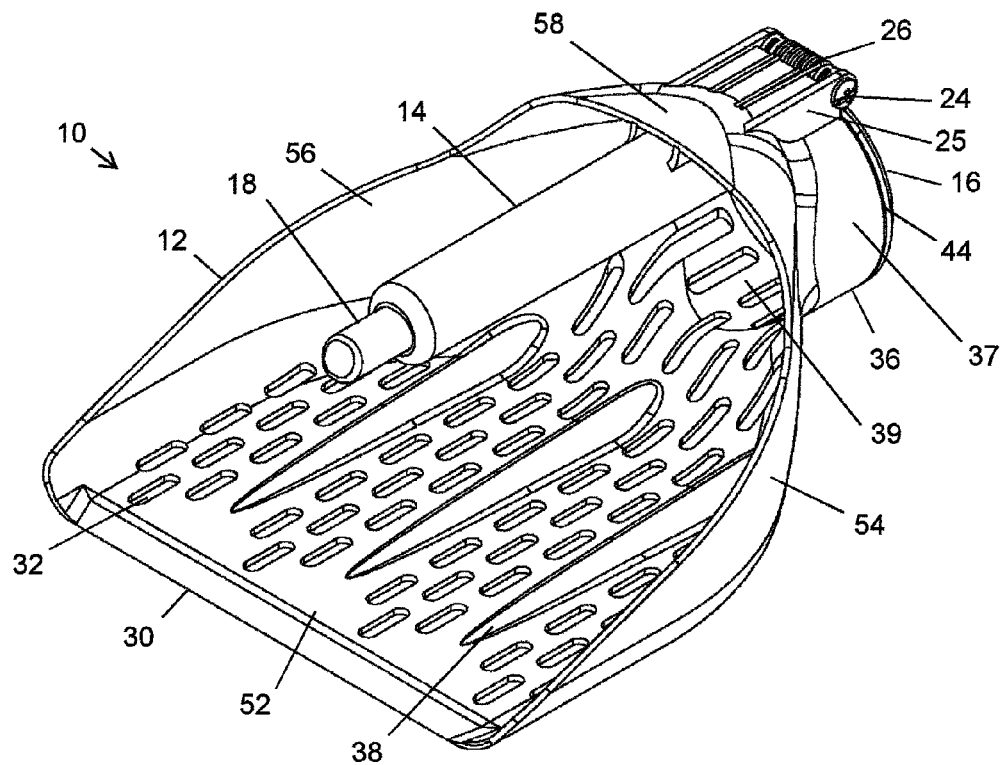
FIG. 1 is a front perspective view of the scooping pan in accordance to one non-limiting aspect of the present invention.

Referring now to the drawings wherein the showing is for the purpose of illustrating non-limiting embodiments of the invention only and not for the purpose of limiting the same, FIGS. 1-10 illustrate non-limiting embodiments of a scooping pan in accordance with the present invention.

The present invention is directed to a scooping pan having an openable and closable rear dumping feature that enables materials collected in the scoop portion of the scooping pan to be removed either from the scooping pan via such rear dumping feature or directly from the scoop portion. The scoop portion may or may not include one or more apertures in the base of the scoop portion. When the scoop portion does not include one or more apertures in the base of the scoop portion, the scooping pan can be used as a dust pan to collect debris from a floor or other surface. When the scoop portion includes one or more apertures in the base of the scoop portion, the scooping pan can be used as a litter scoop to enable unused or unclumped litter to be separated from the used or clumped litter via the one or more apertures in the scoop portion. The scooping pan generally includes a scoop portion, a handle portion, and a rear dumping feature.

With reference to FIGS. 1-5, the scooping pan 10 according to one non-limiting embodiment of the present invention can optionally be used in conjunction with cat litter for the sifting and removal of waste material from a litter box; however, this is not required. As can be appreciated, the scooping pan 10 can be configured and/or adapted to be used in conjunction with the collection and sifting of other particulate objects. The scooping pan includes a scoop portion 12, handle portion 14, and a rear dumping feature 36.

The scoop portion 12 includes a base 52 and side walls 54 and 56. The side walls are positioned on the side edges of base 52 and upwardly from the top surface of the base; however, this is not required. The side walls 54 and 56 can be marginally continuous and integrally formed with base 52; however, this is not required. In such a configuration, no corner or edge exists between base 52 and side walls 54 and 56. In one non-limiting embodiment, a top wall 58 can optionally exist that extends between the two side walls and is positioned over at least a portion of the top surface of the base. Positioned rearwardly of the of the scoop portion is the rear dumping feature 36. The scoop portion 12 can be designed to include a plurality of openings or slots 32 thereby providing a means for sifting material; however, this is not required. The openings or slots 32 can be located in the base and/or side walls. As illustrated in FIG. 1, a plurality of openings or slots 32 are located in the base, but are absent from the side walls. A plurality of openings or slots 32 can optionally be located in the rear dumping feature 36 as illustrated in FIG. 1.

Figure 2:
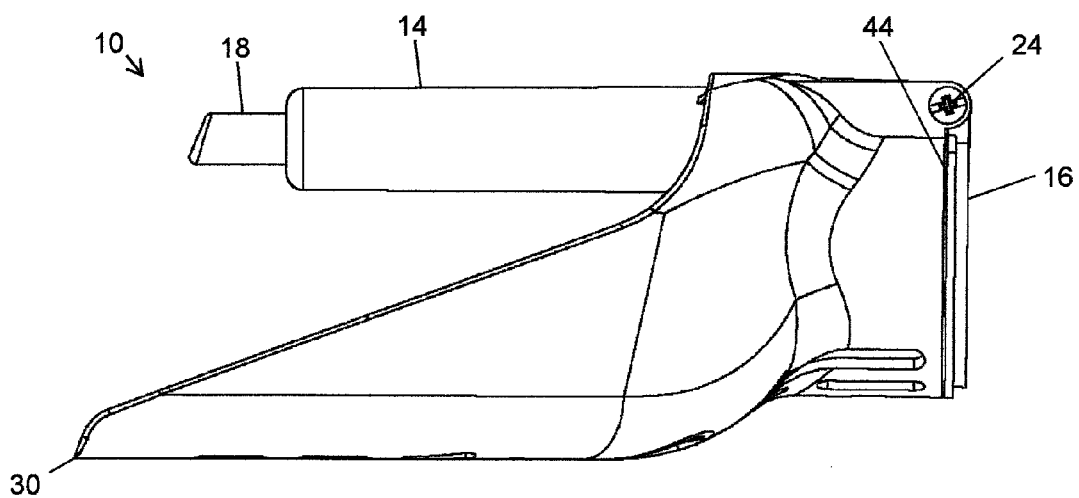
FIG. 2 is a side plan view of the scooping pan of FIG. 1.
Figure 3:
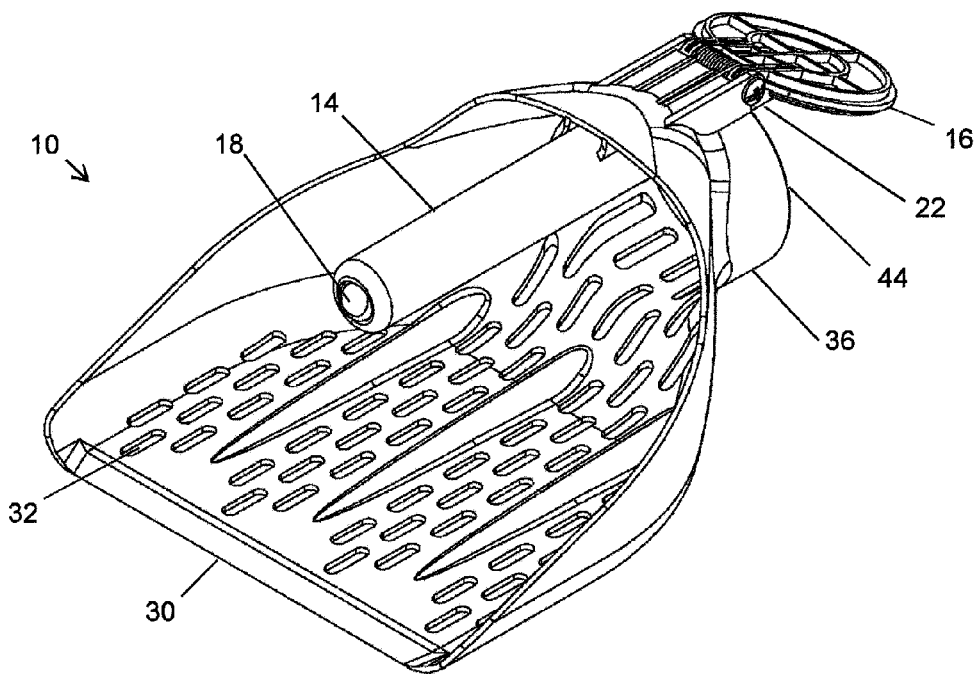
FIG. 3 is a front perspective view of the scooping pan of FIG. 1 wherein the moveable rear retaining wall is in an open position.
Figure 4:
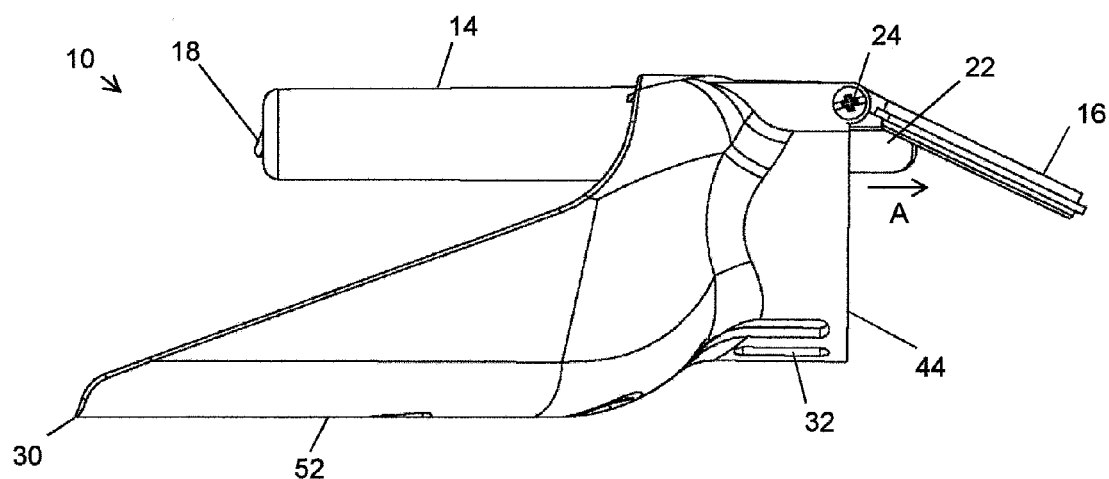
FIG. 4 is a side plan view of FIG. 3.
Figure 7:
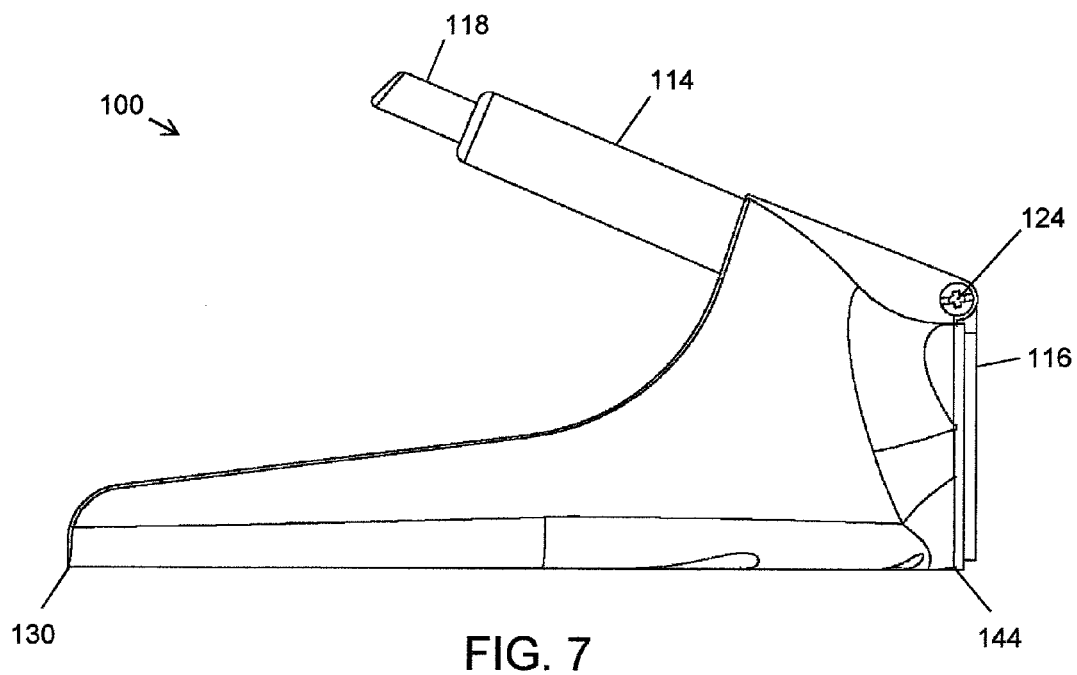
FIG. 7 is a side plan view of the scooping pan of FIG. 6.

The rear dumping feature 36 can be in the form of a rear retaining pocket that is connected to the rear end of the scoop portion. The rear retaining pocket is configured to hold material that has been scooped up by the scoop portion of the scooping pan. The rear retaining pocket is formed of a retaining side wall 37 which partially or fully encircles the retaining cavity 39. The retaining cavity has a front opening that allows materials in the scoop portion to be moved from the top surface of the base and into the retaining cavity. The rear retaining pocket includes a rear retaining wall 16 that partially or fully closes the rear of the retaining cavity so that materials can be held in the retaining cavity. The back portion of the base 52 is illustrated as narrower than the front portion of the base for the purpose of facilitating in the funneling material on the top surface of the base into the rear retaining pocket. The cross-sectional shape of the rear retaining pocket is illustrated as having a constant circular shape along the longitudinal length of the rear retaining pocket; however, this is not required. The base of the rear retaining pocket is illustrated as being elevated above the top surface of the front portion of the base. However, this is not required as illustrated in FIG. 7. The rear retaining wall on the rear retaining pocket is moveable between and open position as illustrated in FIGS. 3 and 4 and a closed position as illustrated in FIGS. 1 and 2. Such a feature enables material in the retaining cavity to be removed via the rear opening in the retaining cavity when the rear retaining wall is moved to an opening position.

Figure 5:
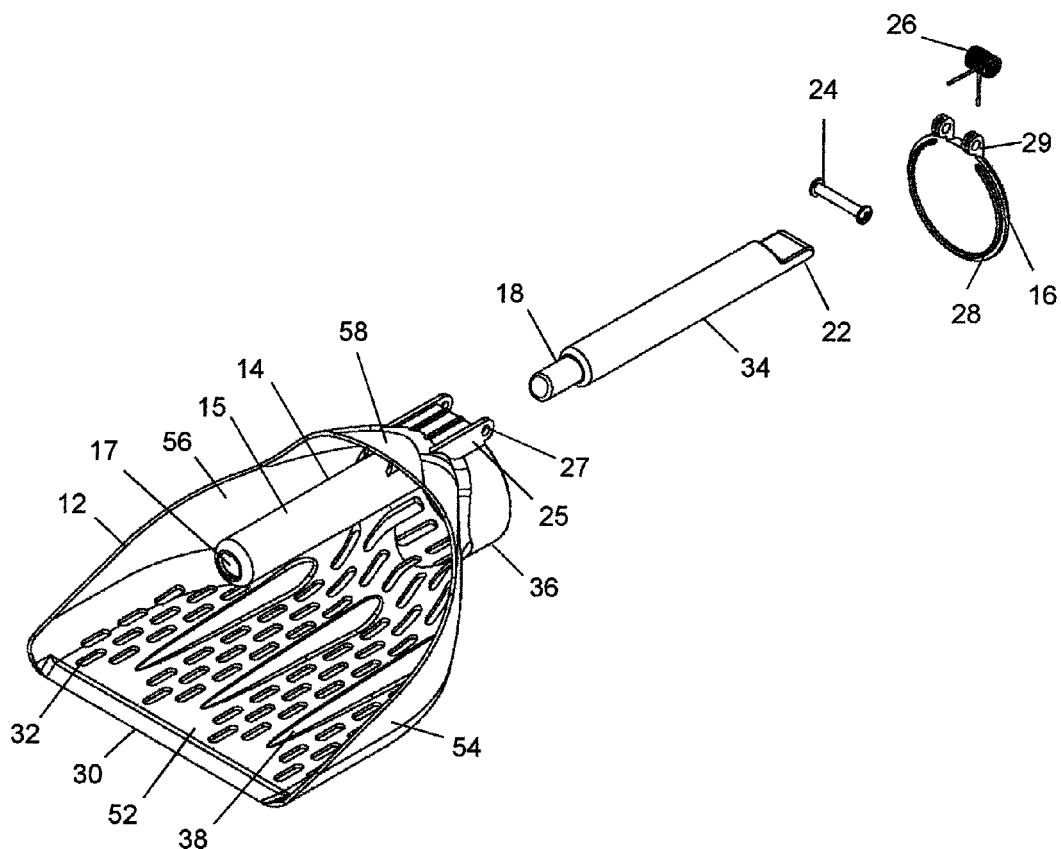
FIG. 5 is an exploded view of the scooping pan of FIG. 1.

The rear retaining wall is connected to the retaining side wall so that the rear retaining wall can pivot relative to the retaining side wall between the open and closed positions. When the rear retaining wall is in the closed position, a liquid seal and/or air tight seal can optionally be formed between the rear retaining wall and the retaining side wall. The rear retaining wall can optionally include a ridge or surface projection 28 extending outwardly from the rear face of the rear retaining wall and be positioned partially or fully around the circumference at or near the outer edge of rear retaining wall as illustrated in FIG. 5. The ridge or surface projection 28 can function as a sealing arrangement for the rear retaining wall; however, this is not required. The ridge or surface projection can be a separate component connected to the rear retaining wall or be integrally formed with the rear retaining wall. The size and shape of the rear retaining wall is generally selected such that the edge of the rear retaining wall contacts the rear edge of the retaining side wall such that the side edges of the rear retaining wall do not pass into the retaining cavity; however, this is not required. In one arrangement, the diameter of ridge or surface projection 28 can be about equal to or slightly less than the diameter of rear aperture 44 of retaining cavity 39; however, this is not required. The diameter of ridge or surface projection 28 can be selected such that ridge or surface projection 28 frictionally engages with the inner surface of retaining cavity 44; however, this is not required.

Referring now to FIG. 2, rear retaining wall 16 can be attached to the rear dumping feature 36 along the top edge of rear retaining wall 16. A flange structure 25 is connected to the outer surface of the retaining side wall. The flange structure is configured to receive a pivot pin 24 and is used to pivotally connect the rear retaining wall to the flange structure. Pivot pin 24 is designed to pass through openings 27 in flange structure 25 and openings 29 in the retaining side wall when pivotally connecting the rear retaining wall to the flange structure. As can be appreciated, other connection arrangements can be used to pivotally connect the rear retaining wall such that the rear retaining wall pivotally moves relative to the retaining side wall. The rear retaining wall can optionally include a locking arrangement to lock the rear retaining wall in the closed position; however, this is not required. The rear retaining wall can be biased in the closed position; however, this is not required. The biasing arrangement can be in the form of a spring 26. As illustrated in FIG. 1, the pivot pin 24 passes through the coils of spring 25 to secure the spring to the flange structure 25. One end of the spring engages the rear retaining wall to cause the rear retaining wall to be biased in the closed position.

The handle portion on the scooping pan is configured to be grasped so that the user can maneuver the scoop portion to scoop materials into the scoop portion or to move the scoop portion in position to receive materials. The handle portion is connected to the rear of the scoop portion. As illustrated in FIG. 1, the rear of the handle portion is connected to the top portion or wall 58 of the scoop portion; however, this is not required. The handle portion extends from the rear portion of the scoop portion to the front potion of the scoop portion. In such an arrangement, the handle portion extends over and above a portion of the top surface of base 52. The end of the handle portion is illustrated as not extending past the front end of the base; however, this is not required. The longitudinal central axis of the handle portion is illustrated in FIG. 2 to lie in a plane that is generally parallel to the plane of the top surface of the front portion of the base; however, this is not required. As can be appreciated, the longitudinal central axis of the handle portion can lie in a plane that is generally non-parallel to the plane of the top surface of the front portion of the base as illustrated in FIG. 7. The cross-sectional shape of the handle portion is illustrated as having a circular shape; however, this is not required.

The handle portion includes a handle housing 15 that has a centrally extending handle cavity 17 with front and rear openings. The shape of the handle cavity is generally cylindrical; however, this is not required. Positioned in the handle cavity is a rod 34. Rod 34 is shaped and sized to be movable in the housing cavity; however, this is not required. The front portion of rod 34 includes a button 18 that is configured to fit through the front opening of handle cavity 17. The rear end of rod 34 includes a driving end 22 that is designed to engage a portion of the rear retaining wall to cause the rear retaining wall to pivotally move between the open and closed positions. As illustrated in FIG. 1, the driving end 22 is configured so that the driving end can slidably move under pin 24 and spring 26; however, this is not required. The length of rod 38 is generally greater than the length of handle cavity 17. When assembled, spring 26 causes the rear retaining wall to be biased in the closed position, which also causes rod 34 to be positioned in the forward position. When the rod is in the forward position, button 18 extends farther outwardly from the front opening of cavity 17 than when the rod is in the rearward position. When the rod is in the rearward position, the rod causes the rear retaining wall to be in the open position. When button 18 is depressed by a user and is caused to move from the forward portion to the rearward position, the driving end 22 of rod 34 exerts a force in the direction of arrow "A" on rear retaining wall 16 (as illustrated in FIG. 4) thereby causing the rear retaining wall to move to the open position.

The handle portion can optionally be textured with a plurality of slip-resistant surface projections for the purpose of improving grip when wet. The textured pattern on the outer surface of the handle portion is non-limiting.

The base 52 of scooping pan 10 can optionally include one or more surface projections 38; however, this is not required. The shapes of the surface projections are non-limiting. The surface projections can be used to provide structural strength and/or rigidity to the scoop portion. The base can optionally include a leading edge 30 wherein the leading edge is beveled or angled. The leading edge can be used to facilitate in the movement of material onto the scoop portion.

The components of the scooping pan 10 according to one non-limiting embodiment of the present invention can be quickly and easily disassembled for cleaning; however, this is not required.

Referring now to FIGS. 6-10, a modification of the scooping pan 10 illustrated in FIGS. 1-5 is shown. Many of the features of the two scooping pans are the same, thus will not be repeated in detail. The operation of the two scooping pans is also very similar, thus will be not repeated in detail.

The scooping pan illustrated in FIGS. 6-10 is in the form of a dust pan and is absent slot or openings in the scoop portion and the rear dumping feature as were described above with regard to the scooping pan illustrated in FIGS. 1-5.

The scooping pan 100 includes a scoop portion 112, handle portion 114, and a rear dumping feature 136. The scoop portion 112 includes a base 152 and side walls 154 and 156. The side walls are positioned on the side edges of base 152 and upwardly from the top surface of the base; however, this is not required. The side walls 154 and 156 can be marginally continuous and integrally formed with base 152; however, this is not required. In such a configuration, no corner or edge exists between base 152 and side walls 154 and 156. As illustrated in FIG. 7, the height of the side walls vary along the length of the side wall. The front portion of the side walls has a lower height than the height of the rear portion of the side wall. A top wall 158 extends between the two side walls and is positioned over at least a portion of the top surface of the base. The top wall is connected to both side walls. Positioned rearwardly of the scoop portion is the rear dumping feature 136. The rear dumping feature 136 can be in the form of a rear retaining pocket that is connected to the rear end of the scoop portion. The rear retaining pocket is formed of a retaining side wall which partially or fully encircles the retaining cavity. The retaining cavity has a front opening that allows materials in the scoop portion to be moved from the top surface of the base and into the retaining cavity. The rear retaining pocket includes a rear retaining wall 116 that partially or fully closes the rear of the retaining cavity so that materials can be held in the retaining cavity.

Figure 6:
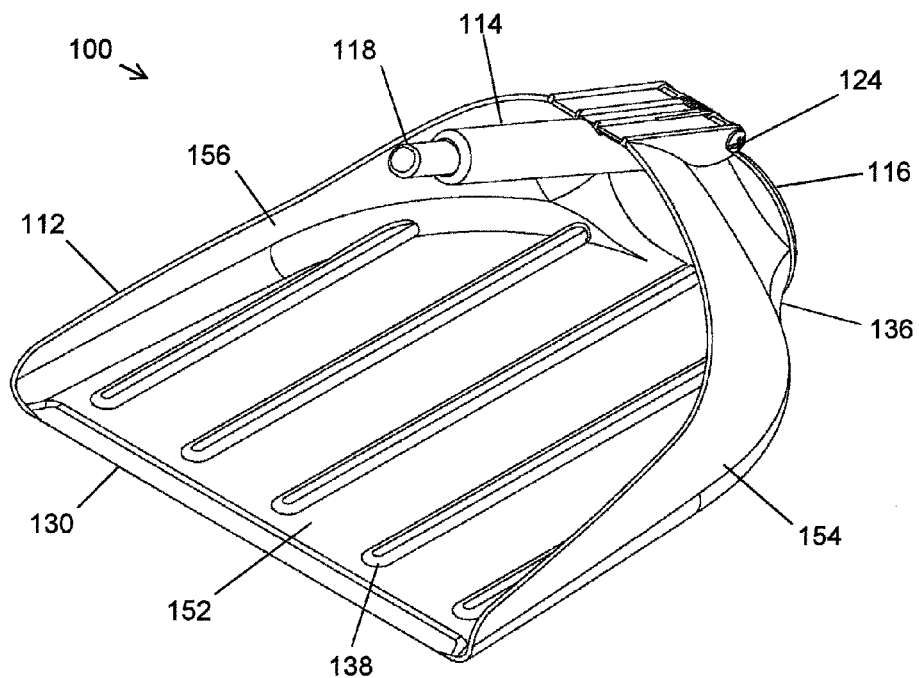
FIG. 6 is a front perspective view of another embodiment of the scooping pan in accordance with one non-limiting aspect of the present invention.
Figure 8:
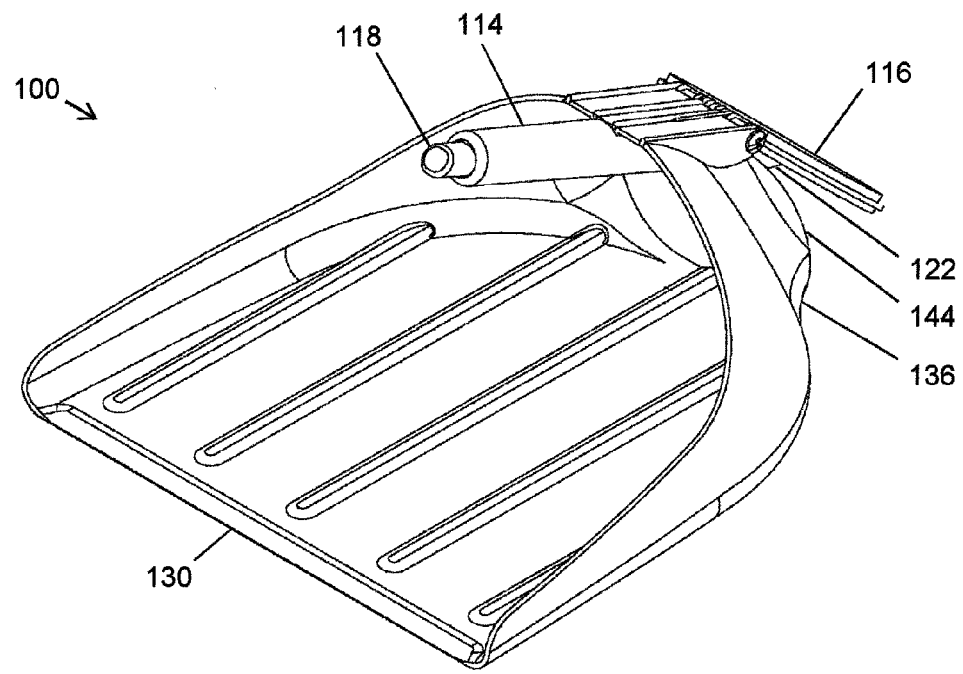
FIG. 8 is a front perspective view of the scooping pan of FIG. 6 wherein the moveable rear retaining wall is in an open position.
Figure 9:
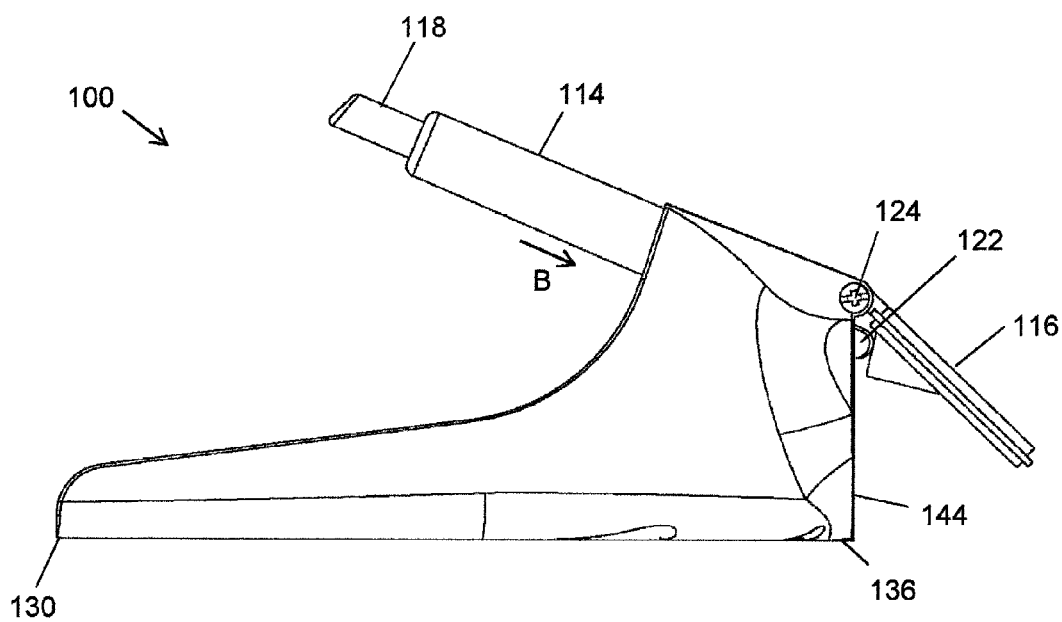
FIG. 9 is a side plan view of FIG. 8.

The back portion of the base 152 is illustrated as narrower than the front portion of the base. The cross-sectional shape of the rear retaining pocket is illustrated as having a constant circular shape along the longitudinal length of the rear retaining pocket; however, this is not required. The base of the rear retaining pocket is illustrated as being generally level with the top surface of the front portion of the base as illustrated in FIG. 7. The rear retaining wall on the rear retaining pocket is moveable between and open position as illustrated in FIGS. 8 and 9 and a closed position as illustrated in FIGS. 6 and 7. Such a feature enables material in the retaining cavity to be removed via the rear opening in the retaining cavity when the rear retaining wall is moved to an open position.

Figure 10:
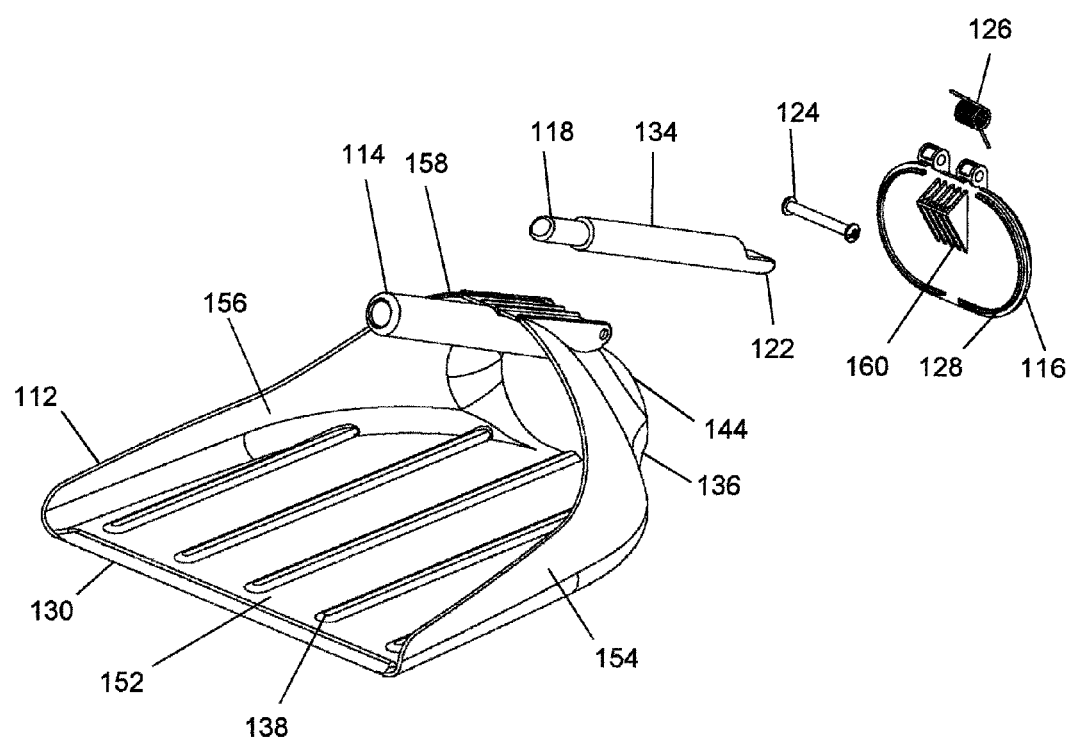
FIG. 10 is an exploded view of the scooping pan of FIG. 6.

The rear retaining wall is connected to the retaining side walls so that the rear retaining wall can pivot relative to the retaining side walls between the open and closed positions. The rear retaining wall can optionally include a ridge or surface projection 128 extending outwardly from the rear face of the rear retaining wall and be positioned partially or fully around the circumference at or near the outer edge of rear retaining wall as illustrated in FIG. 10.

Rear retaining wall 116 can be attached to the rear dumping feature 36 along the top edge of rear retaining wall 116. A flange structure is connected to the outer surface of the retaining side wall. The flange structure is configured to receive a pivot pin 24 and is used to pivotally connect the rear retaining wall to the flange structure. Pivot pin 24 is designed to pass through openings in flange structure and openings in retaining side wall when pivotally connecting the rear retaining walls to the flange structure. The rear retaining wall can be biased in the closed position; however, this is not required. The biasing arrangement can be in the form of a spring 126.

The handle portion on the scooping pan is configured to be grasped so that the user can maneuver the scoop portion to scoop materials into scoop portion or to move the scoop portion in position to receive materials. The handle portion is connected to the rear of the scoop portion. As illustrated in FIG. 6, the rear of the handle portion is connected to the top portion or wall 158 of the scoop portion; however, this is not required. The handle portion extends from the rear portion of the scoop portion to the front potion of the scoop portion. In such an arrangement, the handle portion extends over and above a portion of the top surface of base 152. The end of the handle portion is illustrated as not extending past the front end of the base; however, this is not required. The longitudinal central axis of the handle portion is illustrated in FIG. 7 to lie in a plane that is non-parallel to the plane of the top surface of the front portion of the base (e.g., angling upwardly); however, this is not required. The cross-sectional shape of the handle portion is illustrated as having a circular shape; however, this is not required.

The handle portion includes a handle housing that has a centrally extending handle cavity with front and rear openings. The shape of the handle cavity is generally cylindrical; however, this is not required. Positioned in the handle cavity is a rod 134. Rod 134 is shaped and sized to be movable in the housing cavity; however, this is not required. The front portion of rod 134 includes a button 118 that is configured to fit through the front opening of handle cavity. The rear end of rod 134 includes a driving end 122 that is designed to engage a portion of the rear retaining wall to cause the rear retaining wall to pivotally move between the open and closed positions. As illustrated in FIG. 6, the driving end 122 is configured so that the driving end can slidably move under pin 124 and spring 126; however, this is not required. The length of rod 138 is generally greater than the length of handle cavity. When assembled, spring 126 causes the rear retaining wall to be biased in the closed position, which also causes rod 134 to be positioned in the forward position. When the rod is in the forward position, button 118 extends farther outwardly from the front opening of cavity than when the rod is in the rearward position.

The base 152 of scooping pan 10 can optionally include one or more surface projections 138; however, this is not required. The shapes of the surface projections are non-limiting. The surface projections can be used to provide structural strength and/or rigidity to the scoop portion. The base can optionally include a leading edge 130 wherein the leading edge is beveled or angled. The leading edge can be used to facilitate in the movement of material onto the scoop portion.

The invention has been described with reference to a number of different embodiments. It is to be understood that the invention is not limited to the exact details of construction, operation, exact materials or embodiments shown and described, as obvious modifications and equivalents will be apparent to one skilled in the art. It is believed that many modifications and alterations to the embodiments disclosed will readily suggest themselves to those skilled in the art upon reading and understanding the detailed description of the invention. It is intended to include all such modifications and alterations insofar as they come within the scope of the present invention.

What is claimed:

1. A scooping pan comprising:
   a scoop portion configured to retain materials collected on a top surface of the scoop portion, said scoop portion including a base, first and second side walls connected to said base, and a handle portion, said handle portion configured to manipulate the position of the scoop portion, said handle portion extends outwardly from a rear of said scoop portion such that over 50% of said handle portion extends over a top surface of said base; and,
   a rear dumping structure configured to collect material that was positioned on said scooping portion, said rear dumping feature including retaining side walls that at least partially encircle a retaining cavity and a rear retaining wall, said retaining cavity having a front opening and a rear opening, said front opening configured to enable materials on said scoop portion to be moved into said retaining cavity, said rear dumping structure permanently connected to said scoop portion such that said retaining cavity is maintained in a fixed position relative to said first and second side walls of said scoop portion, said rear retaining wall movable between an open and closed position, said rear retaining wall movably positioned at a rear of said retaining side wall, said rear retaining wall in said closed position substantially covering said rear opening to inhibit or prevent solid materials in said retaining cavity from exiting said rear opening, said rear retaining wall in said opened position positioned farther from said rear opening than when said rear retaining wall is in said closed position, said rear retaining wall in said opened position allowing solid materials in said retaining cavity to exit said rear opening.

2. The scooping pan as defined in claim 1, wherein a front of said rear dumping structure is elevated above a top surface of a front portion of said base, a rear portion of said base slopes upwardly from said front portion of said base to said front of said rear dumping structure.

3. The scooping pan as defined in claim 1, wherein said rear retaining wall pivots between said open and closed position relative to said rear opening of said retaining cavity.

4. The scooping pan as defined in claim 2, wherein said rear retaining wall pivots between said open and closed position relative to said rear opening of said retaining cavity.

5. The scooping pan as defined in claim 1, wherein said rear retaining wall includes a surface projection on a rear face of said rear retaining wall and is positioned at least partially around a circumference of said rear retaining wall, said surface projection configured to at least partially enter said retaining cavity when said rear retaining wall is in said closed position.

6. The scooping pan as defined in claim 5, wherein said rear retaining wall includes a surface projection on a rear face of said rear retaining wall and is positioned at least partially around a circumference of said rear retaining wall, said surface projection configured to at least partially enter said retaining cavity when said rear retaining wall is in said closed position.

7. The scooping pan as defined in claim 1, wherein said rear retaining wall is biased in said closed position.

8. The scooping pan as defined in claim 7, wherein said rear retaining wall is biased in said closed position.

9. The scooping pan as defined in claim 1, wherein said scoop portion includes a plurality of openings in said base.

10. The scooping pan as defined in claim 9, wherein said scoop portion includes a plurality of openings in said base.

11. A scooping pan comprising:
    a scoop portion configured to retain materials collected on a top surface of the scoop portion, said scoop portion including a base, first and second side walls connected to said base, and a handle portion, said handle portion configured to manipulate the position of the scoop portion, said scoop portion includes a plurality of openings in said base; and,
    a rear dumping structure configured to collect material that was positioned on said scooping portion, said rear dumping feature including retaining side walls that at least partially encircle a retaining cavity and a rear retaining wall, said retaining cavity having a front opening and a rear opening, said front opening configured to enable materials on said scoop portion to be moved into said retaining cavity, said rear retaining wall movable between an open and closed position, said rear retaining wall movably positioned at a rear of said retaining side wall, said rear retaining wall in said closed position substantially covering said rear opening to inhibit or prevent solid materials in said retaining cavity from exiting said rear opening, said rear retaining wall in said opened position positioned farther from said rear opening than when said rear retaining wall is in said closed position, said rear retaining wall in said opened position allowing solid materials in said retaining cavity to exit said rear opening, said retaining side wall includes a plurality of openings that are spaced from said front and rear openings of said retaining cavity.

12. The scooping pan as defined in claim 10, wherein said retaining side wall includes a plurality of openings that are spaced from said front and rear openings of said retaining cavity.

13. A scooping pan comprising:
    a scoop portion configured to retain materials collected on a top surface of the scoop portion, said scoop portion including a base, first and second side walls connected to said base, and a handle portion, said handle portion configured to manipulate the position of the scoop portion, said handle portion comprises an actuation mechanism to cause said rear retaining wall to move between said open and said closed position, said actuation mechanism including a rod that is movably positioned in a cavity of said handle portion, a front end of said rod extending outwardly from a front cavity opening in said handle portion, a rear end of said rod configured to engage said rear retaining wall when said front portion of said rod is depressed to thereby cause said rear retaining wall to move to said open position; and, a rear dumping structure configured to collect material that was positioned on said scooping portion, said rear dumping feature including retaining side walls that at least partially encircle a retaining cavity and a rear retaining wall, said retaining cavity having a front opening and a rear opening, said front opening configured to enable materials on said scoop portion to be moved into said retaining cavity, said rear retaining wall movable between an open and closed position, said rear retaining wall movably positioned at a rear of said retaining side wall, said rear retaining wall in said closed position substantially covering said rear opening to inhibit or prevent solid materials in said retaining cavity from exiting said rear opening, said rear retaining wall in said opened position positioned farther from said rear opening than when said rear retaining wall is in said closed position, said rear retaining wall in said opening position allowing solid materials in said retaining cavity to exit said rear opening.

14. The scooping pan as defined in claim 12, wherein said handle portion comprises an actuation mechanism to cause said rear retaining wall to move between said open and said closed position, said actuation mechanism including a rod that is movably positioned in a cavity of said handle portion, a front end of said rod extending outwardly from a front cavity opening in said handle portion, a rear end of said rod configured to engage said rear retaining wall when said front portion of said rod is depressed to thereby cause said rear retaining wall to move to said open position.

15. The scooping pan as defined in claim 1, wherein said handle portion angles upwardly from said top surface of a front portion of said base.

16. The scooping pan as defined in claim 14, wherein said handle portion angles upwardly from said top surface of a front portion of said base.

17. A scooping pan comprising:
a scoop portion configured to retain materials collected on a top surface of the scoop portion, said scoop portion including a base, first and second side walls connected to said base, and a handle portion, said handle position configured to enable a user to manipulate a position of said scoop portion;
a rear dumping structure configured to collect material that is positioned on said scooping portion when said scooping portion is rearwardly tilted, said rear dumping structure including retaining side walls that at least partially encircle a retaining cavity and a rear retaining wall, said retaining cavity having a front opening and a rear opening, said front opening configured to enable materials on said scoop portion to move into said retaining cavity when said scooping portion is rearwardly tilted, said rear dumping structure permanently connected to said scoop portion such that said retaining cavity is maintained in a fixed position relative to said first and second side walls of said scoop portion, said rear retaining wall movable between an open and a closed position, said rear retaining wall movably positioned at a rear of said retaining side wall, said rear retaining wall configured to pivot between said open and closed position relative to said rear opening of said retaining cavity, said rear retaining wall biased in said closed position, said rear retaining wall in said closed position substantially covering said rear opening to inhibit or prevent solid materials in said retaining cavity from exiting said rear opening scooping portion when said scooping pan is rearwardly tilted, said rear retaining wall in said open position positioned farther from said rear opening than when said rear retaining wall is in said closed position, said rear retaining wall in said open position allowing solid materials in said retaining cavity to exit said rear opening when said scooping pan is rearwardly tilted, a front of said rear dumping structure is elevated above a top surface of a front portion of said base, a rear portion of said base slopes upwardly from said front portion of said base to said front of said rear dumping structure; and,
an actuation mechanism to cause said rear retaining wall to move between said open and said closed position.

18. The scooping pan as defined in claim 17, wherein said rear retaining wall includes a peripheral surface projection on a rear face of said rear retaining wall and is positioned at least partially around a circumference of said rear retaining wall, said peripheral surface projection configured to at least partially enter said retaining cavity when said rear retaining wall is in said closed position and be positioned closely adjacent to an interior surface of said retaining cavity, said rear retaining wall includes a central surface projection configured to engage said actuation mechanism.

19. The scooping pan as defined in claim 17, wherein said scoop portion includes a plurality of openings in said base.

20. The scooping pan as defined in claim 17, wherein said base and said retaining side wall of said scoop portion includes a plurality of openings, said plurality of openings in said retaining side wall are spaced from said front and rear openings of said retaining cavity.

21. A scooping pan comprising:
a scoop portion configured to retain materials collected on a top surface of the scoop portion, said scoop portion including a base, first and second side walls connected to said base, and a handle portion, said handle position configured to enable a user to manipulate a position of said scoop portion, said handle portion includes at least a portion of said actuation mechanism, said actuation mechanism including a rod arrangement that is movably positioned in a cavity of said handle portion, a front end of said rod arrangement extending outwardly from a front cavity opening in said handle portion, a rear end of said rod arrangement configured to engage said rear retaining wall when said front portion of said rod is depressed to thereby cause said rear retaining wall to move to said open position;
a rear dumping structure configured to collect material that is positioned on said scooping portion when said scooping portion is rearwardly tilted, said rear dumping structure including retaining side walls that at least partially encircle a retaining cavity and a rear retaining wall, said retaining cavity having a front opening and a rear opening, said front opening configured to enable materials on said scoop portion to move into said retaining cavity when said scooping portion is rearwardly tilted, said rear retaining wall movable between an open and a closed position, said rear retaining wall movably positioned at a rear of said retaining side wall, said rear retaining wall configured to pivot between said open and closed position relative to said rear opening of said retaining cavity, said rear retaining wall biased in said closed position, said rear retaining wall in said closed position substantially covering said rear opening to inhibit or prevent solid materials in said retaining cavity from exiting said rear opening scooping portion when said scooping pan is rearwardly tilted, said rear retaining wall in said open position positioned farther from said rear opening than when said rear retaining wall is in said closed position, said rear retaining wall in said opened position allowing solid materials in said retaining cavity to exit said rear opening when said scooping pan is rearwardly tilted; and, an actuation mechanism to cause said rear retaining wall to move between said open and said closed position.

22. The scooping pan as defined in claim 17, wherein said handle portion extend outwardly from a rear of said scoop portion such that over 50% of said handle portion extends over a top surface of said base, said handle portion spaced above said top surface of said base.

23. The scooping pan as defined in claim 17, wherein said handle portion angles upwardly from said top surface of a front portion of said base.

24. The scooping pan as defined in claims 17, wherein said base of said scoop portion includes one or more surface projections, said one or more surface projections configured to provide structural strength, rigidity or combinations thereof to said scoop portion.

* * * * *